March 14, 1967     P. R. O'BRIEN     3,309,016
DESALINIZATION OF SALT WATER AND APPARATUS THEREFOR
Filed Nov. 4, 1965     4 Sheets-Sheet 2

INVENTOR
Paul R. O'Brien

BY Thomas, Weisman & Russell
ATTORNEYS

March 14, 1967  P. R. O'BRIEN  3,309,016
DESALINIZATION OF SALT WATER AND APPARATUS THEREFOR
Filed Nov. 4, 1965  4 Sheets-Sheet 3

INVENTOR
Paul R. O'Brien
BY Thomas, Weisman & Russell
ATTORNEYS

INVENTOR
Paul R. O'Brien 3,309,016
DESALINIZATION OF SALT WATER AND
APPARATUS THEREFOR
Paul R. O'Brien, 2912 Brixham Drive,
Richmond, Va. 23235
Filed Nov. 4, 1965, Ser. No. 506,356
4 Claims. (Cl. 233—20)

This application is a continuation-in-part of my co-pending application Serial No. 318,385, filed Oct. 23, 1963, now abandoned.

This invention relates to centrifugal separation equipment and a method for using it for the conversion of saline water into fresh water of sufficient purity for human consumption. In this regard the invention also proposes an effective method and apparatus for reducing the dissolved solids into a saline slurry enabling ready conversion thereof into the various chemical components inherently present in sea water.

The centrifugal separation equipment herein identified is particularly adapted to the separation of dissolved compounds, either chemical or metallic, organic or inorganic in nature, and which are of a different specific gravity or weight than the base liquid.

Although there are several known techniques at the present time which are used for the conversion of sea water into fresh water, such procedures exhibit marked production cost penalties when compared to the obtaining of potable water from the usual natural sources—fresh water inland lakes, rivers, and underground springs or wells.

In the instant invention centrifugal force is utilized as the basic principle of separation to segregate the salt components into such form that ultimate purification into the fundamental elements thereof is rendered possible, it being recognized that certain basic inorganics, such as NaCl, $MgCl_2SO_4$, $CaCl_2$, KCl, are ever present in natural saline solutions.

As is well known, saline water which is found in the world's seas and oceans exhibit several properties that differentiate it from fresh water; in the present instance, natural salt water is particularly suited for separation into its various elements by the equipment and methods herein outlined and forming the basic concept of this invention.

An important characteristic of sea water is found in its heavy concentration of salts, in solution therein. The concentration of these salts vary from almost fresh water near the mouth of rivers which empty into the sea, to about 4.2% inclosed sea basins. As an average, salinity is present percentagewise about 3.5%, or 35 parts per 1,000 parts.

Also, the salts in solution render saline water heavier than fresh water; these also lower the freezing point by about 4 degrees—i.e., from 32° F. for fresh water to about 28° F. for sea water. In this connection, one of the observed phenomena that occurs during the formation of ice crystals is that the latter force the saline ions aside as such ice crystals grow. A further consequence of this is a decrease in density as the water molecules occupy a larger space than they occupied as a liquid.

Sea water that is subjected to natural evaporation by the action of the sun's rays or by artificial evaporation, as by heating to boiling, to a temperature of about 212°, produces the effect of transforming the liquid water molecules into gaseous form, and, since the latter is lighter than the saline materials, such passes from the main body of water into the atmosphere with the result that the heavier salts are left behind.

Having this preliminary backgorund in mind it is therefore a primary purpose of this invention to make possible the conversion of saline sea water or inland brackish waters into fresh water at production costs at levels that are competitive with conventional fresh water sources of supply plus their costs of filtration and purification.

An additional objective of this invention is to make use of the stated unique and inherent properties of saline water by employing centrifugal separation equipment of novel design to effectively accomplish such conversion of saline water to fresh water of a sufficient purity for human consumption.

It is a further object of the invention to utilize the principle of centrifugal separation as a basic mode of operation to separate the saline or salt components contained in sea water from the water molecules in which such components are in solution in order to produce fresh potable water. In other words, a fundamental concept of my invention is the separation of saline water into its two basic divisions: that of the salts or saline materials and that of the water in such manner as to produce fresh water suitable for human consumption.

Another objective of my invention is the utilization of centrifugal separation as the principle, or mode of operation for effective separation of the saline materials contained in saline water from the water molecules, wherein expensive and time consuming pretreatment of the particular saline solution which is involved, is eliminated.

Another object of the invention is the separation of saline solutions into its two basic divisions: that of greater specific gravity and that of lesser specific gravity. In this regard, in one aspect of the invention, heating of the saline solution to up from about 125° F. to about 175° F. prior to injection into the centrifugal separation equipment may be preferred.

A further object of my invention, and alternate embodiment thereof, contemplates first lowering the temperature of the saline water to about freezing (from about 28° F. to about 35° F.) and then injecting the chilled saline water into the centrifugal separation equipment.

A further objective of the invention is the provision of a process, and apparatus, wherein the solid or salt components of the saline solution are so separated through the media of centrifugal force, that such separated solids initially appear in a slurry form that predominates in the several components thereof—as NaCl, $MgCl_2SO_4$, $CaCl_2$, KCl. This slurry is produced in such form as to be readily adaptable to further refining by known commercial processes. In other words, the named chlorides and/or sulfates are then, by known commercial methods, reduced to the respective metals as, e.g., sodium, magnesium and potassium.

Further objects and advantages of this invention will be apparent from the following more detailed description and several drawings explanatory thereof, and in which.

Figure 1:
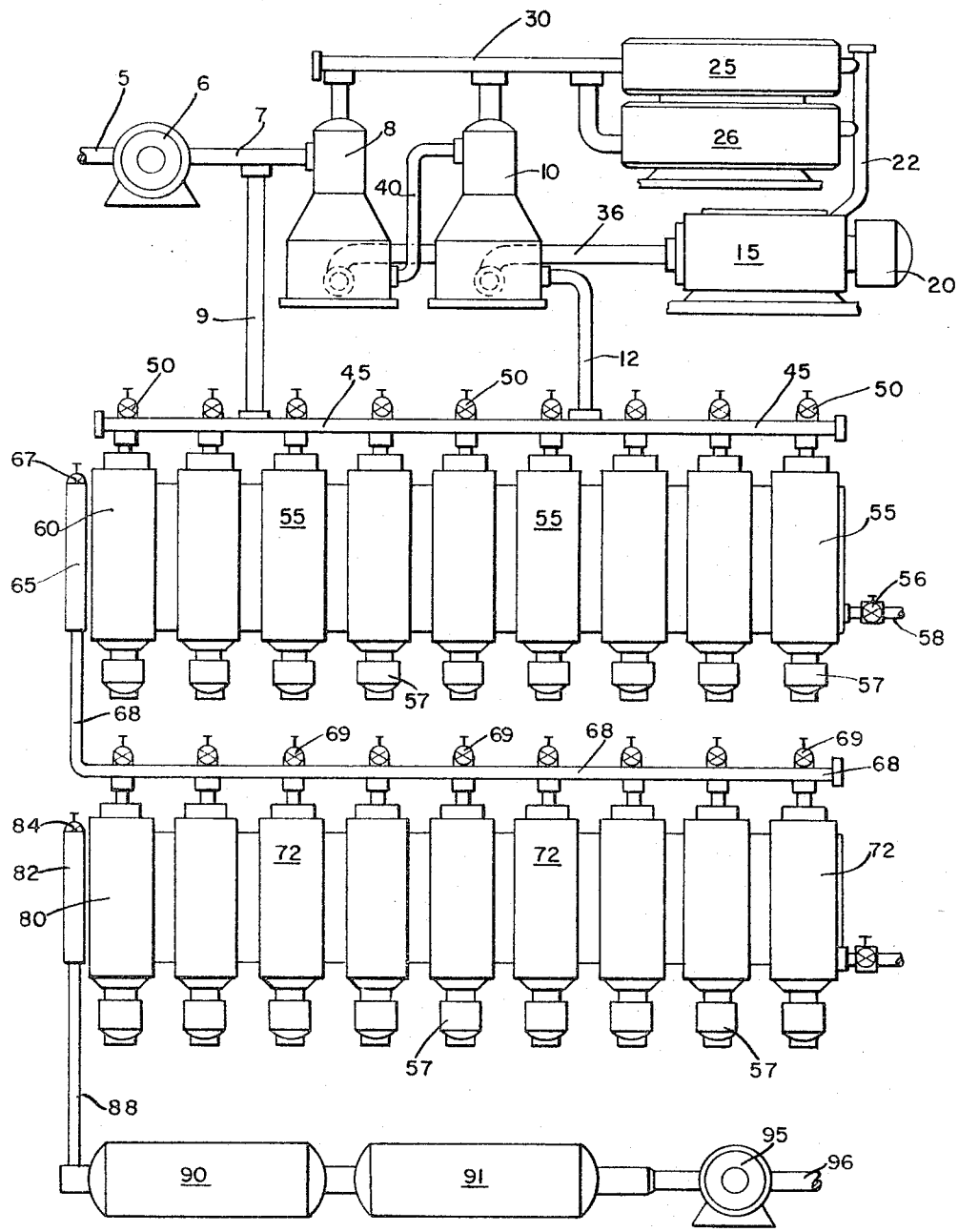
FIGURE 1 represents, in more or less diagrammatic form, a flow chart showing the various stages or sequence of operations, particularly the several centrifuging stages, that occur commencing with the raw sea water input and concluding with fresh water supply output to a central distributing system.

Referring more particularly to FIGURE 1, raw sea or saline water enters intake pipe 5 as induced by the section of pump 6. The saline water is now under pressure, such pressure being sufficient to optionally deliver the solution to the heat exchangers 25 and 26 through lines 7 and 30 and thence through lines 22, 36 and 12 to the first bank, or directly to the bank through line 9. Suitable valving equipment may be utilized for this purpose.

The reason for the optional points of delivery of the raw sea water is that, due to the unique construction and operation of the centrifugal separation equipment, it is possible to have optional methods of pretreatment of the raw sea water, i.e., either by storing the thermal energy in the water by heating thereof, or, contrariwise, by the removal of heat by chilling. In this regard, it is also possible to deliver the raw sea water direct to the centrifugal separation equipment without pretreatment if sufficient velocity is attained in the centrifugal separators, e.g., a velocity resultant upon a force some 20,000 to 50,000 times the force of gravity. However, since this may involve a factor normally too high by way of operating speeds, alternate methods of pretreatment of the raw saline water may be preferable. In any event, this invention is to be understood as not limited to the heating or chilling of saline water as a required pretreatment step prior to its conversion into fresh water.

At any rate, when the optional and alternate treatment of chilling is employed as a pretreatment stage, then units 8 and 10 are used as the evaporators of an integral chilling-refrigeration system over the coils of which the raw sea water is passed to reduce its temperature, in a two stage sequence, from its normal temperature to a temperature of from about 28° F. to as high as about 35° F.

A suitable compressor 15 compresses the refrigerant, as Freon or the like. The compressor is impelled by motor 20, and compressed refrigerant sent through to evaporators 8 and 10. Following the removal of heat at this stage, the refrigerant is recycled through appropriate lines (not shown) to the compressor 15 to commence a new cycle.

The raw saline water which enters the refrigeration system (preferably as shown a two stage system) is chilled to about 40° F. (plus or minus 10°) in the first stage 8. It is then pumped through line 40 to the second stage 10 where the sea water is further reduced in temperature to about 28° F. (plus or minus 5°). Following this removal of thermal energy and reduction in the amount of latent heat of fusion, the saline water is then pumped to the main distribution pipe line 45 by way of conduit 12.

A series of metering devices 50, and as shown, are all directly connected to the main distribution pipe line 45. The purpose of such metering valves 50 is to permit the proper volume of chilled water from evaporators 8 and 10 to be passed into the respective charging chambers of a bank of a plurality of series interconnected centrifugal separators 55, all of which are of like construction. As soon as a predetermined and proper volume of water is passed into the respective charging chambers of each of such separators the appropriate metering valve closes and remains closed until called upon to meter a new volume of water into these charging chambers of the separators.

Each of the centrifugal separators 55 rotate continuously at very high rates of speed, the latter being variable through drive motors 57. The speed is preselected and depends upon the temperature of the water, its salinity, the size of the separator, etc.

When charged with chilled raw saline water into the charging chambers, the centrifugal force created by the centrifuge and the shape of the charging chamber forces the water into the separator chambers, where in a very short space of time the volume of raw chilled water is separated into two parts, that of salts (in concentrated solution) and that of water. The water is discharged through discharge valve 56 and collector conduit 58.

A concentrated salt solution is discharged from the end separator, here generally designated at 60, of the series of separators 55. This concentrated saline solution is discharged to pump 65, with a valve 67 metering the same. The pump 65 forces the concentrate through distributor line 68 to another series of metering valves 69.

In this manner the concentrate is thus directed to another series of centrifuges 72. Here the concentrate or slurry undergoes a similar contrifugal separation, as outlined for separators 55, but in this case the separators 72 are rotated at a higher velocity than those of the first stage thereby causing a further separation of the remaining solution into two parts: Firstly, that comprising primarily the salt product, or heavily concentrated slurry, which is discharged through valve 73 and line 74; and, secondly, the water portion that is successively passed through separators 72 to the final separator in the series, here generally indicated at 80. It is then pumped by pump 82 through metering valve 84, and finally through line 88 to a suitable reservoir, as storage tanks 90 and 91. It may then be removed from such storage tanks by pump 95 for use, or alternatively, a portion of it returned to the heat exchangers 25 and 26 where it is there employed as a heat exchange medium or agent before discharge into the main fresh water discharge line 96. By thus utilizing the energy to chill the incoming raw sea water a greater economy of operation is insured for the overall process.

The main purpose of these two stages of separation, occurring through the series of centrifuges 55 in the first instance, and through the centrifuges 72 in the second instance, is to obtain the maximum use of the energy required in chilling the raw sea water by the evaporators 8 and 10. The net output of fresh water by the two stage centrifugal separation is about 70 to 80 percent of the gross input of raw sea water, thereby vastly improving the economic conservation of energy which may be directlly translatable to cost of operation.

The centrifugal separators of the first stage are designed to exert up to about 25,000 times the force of gravity.

The second stage separators are adapted to obtain from about 25,000 to 40,000 times the force of gravity, this being exerted in a type of separating chamber of unique design, as will hereinafter be described.

The number and size of the separators in both banks of centrifuges is determined by the daily planned fresh water output for the entire installation. This also applies to the size and number of the evaporators, heat exchangers, compressors, compressor motors, etc.

When the second optional method of pretreating the raw sea water is employed, that of heating, it may be done in one of two temperature ranges. The first temperature range can be about 150° F. (plus or minus 25°). When the raw sea water is heated to the desired temperature and delivered to the first bank of centrifugal separators, a centrifugal force of approximately 35,000 times the force of gravity must be applied to bring about the separation of the salts from the water.

When this second optional method of pretreating the raw sea water is employed, that of heating, a higher temperature in the range of 174° F. (plus or minus 38°) may be used. In this latter instance when the heated raw sea water is delivered to the first bank of centrifugal separators, a centrifugal force of approximately 20,000 times the force of gravity must be applied to bring about the separation of the salts from the water. The resultant slurry is then discharged into its separate collector.

As previously described, the purified water, after being processed in the first bank of separators, is discharged through valve 56 and line 58. The salt water concentrate or slurry is collected at pump 65, forced through valve 67, then sent through main line 68 where it is metered through valves 69 into the second bank of separators 72. The salt water concentrate is then subjected to centrifugal forces of increased magnitude, on the order of 30 to 50 percent greater than that used in the first bank of separators, this being due primarily to the fractional heat loss and increased salts concentration in this stage of operation.

When heat exchangers 25 and 26 are used for heating the raw saline water, required amounts of thermal energy are necessary since the heat exchangers then become, in effect, boilers. It is also necessary in large saline to fresh water conversion units, and for purposes of economy, to generate all of the electrical power necessary to drive the several banks of centrifugal separators, pumps, electrically controlled metering valves and other equipment.

When the pretreatment given to the raw saline water is that of chilling by refrigeration, again reasonable amounts of electrical power are necessary particularly for the operation of the compressors and fractional amounts of power for the centrifugal separators, pumps, electrically operated metering valves, internal hydraulic systems and other equipment.

The electrical power and thermal energy generation systems can utilize natural gas, oil or fossil fuels including coal and coke depending upon their availability and economy delivered on location of the saline water conversion installation. However, in those areas of the world where the generation of thermal energy and electrical power do not employ conventional fuels because of their relatively high costs, then atomic energy can be very effectively utilized for the production of the energy requirement.

Several different types of atomic reactors are suitable for heating the raw saline water such as a sodium cooled reactor wherein the heat exchanger of the atomic reactor become the boilers 25 and 26 of FIGURE 1. A super-heated steam atomic reactor of similar design will function in the same manner and will produce adequate thermal and electrical energy requirements.

An atomic reactor can also be utilized effectively for the production of electrical power necessary for the operation of its refrigeration compressors when chilling of the raw saline water is employed as a pretreatment step.

Figure 3:
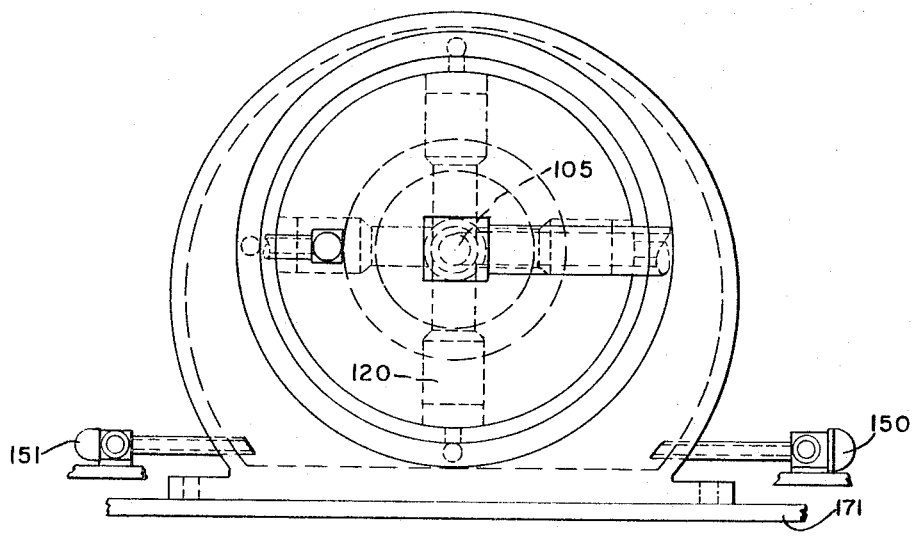
FIGURE 3 is a side elevation view of that component of the invention as shown in FIGURE 4.
Figure 4:
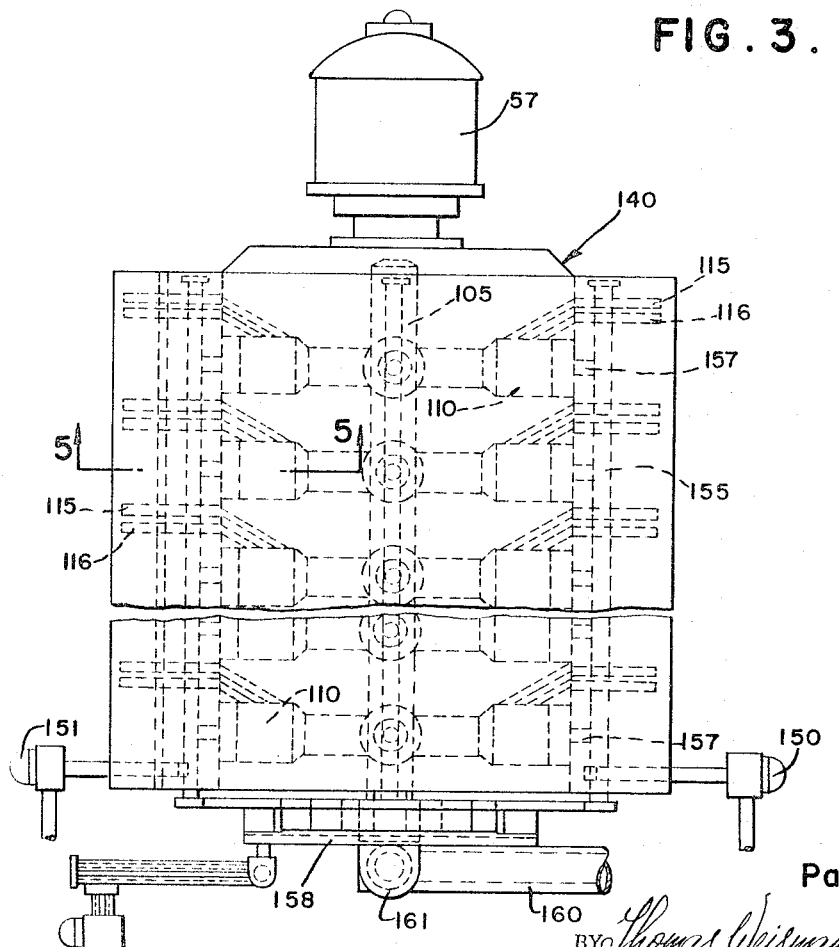
FIGURE 4 is an enlarged plan view of one of the centrifugal separators forming an essential mechanical component of the invention.

A more complete and detailed drawing of the type of centrifuging apparatus here contemplated is found in FIGURE 4. Such represents an enlarged plan view of a rotor-centrifugal separator with its related functional systems. FIGURE 3 represents an end view of the same system.

Figure 5:
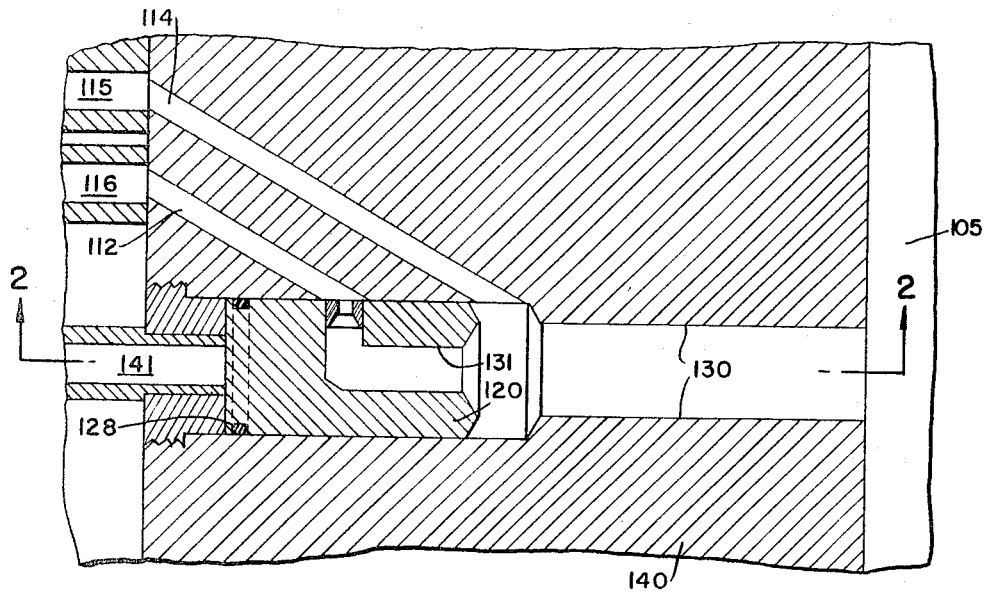
FIGURE 5 is an enlarged cross section taken on the line 5—5 of FIGURE 4, and illustrating the discharge ports in open position.
Figure 6:
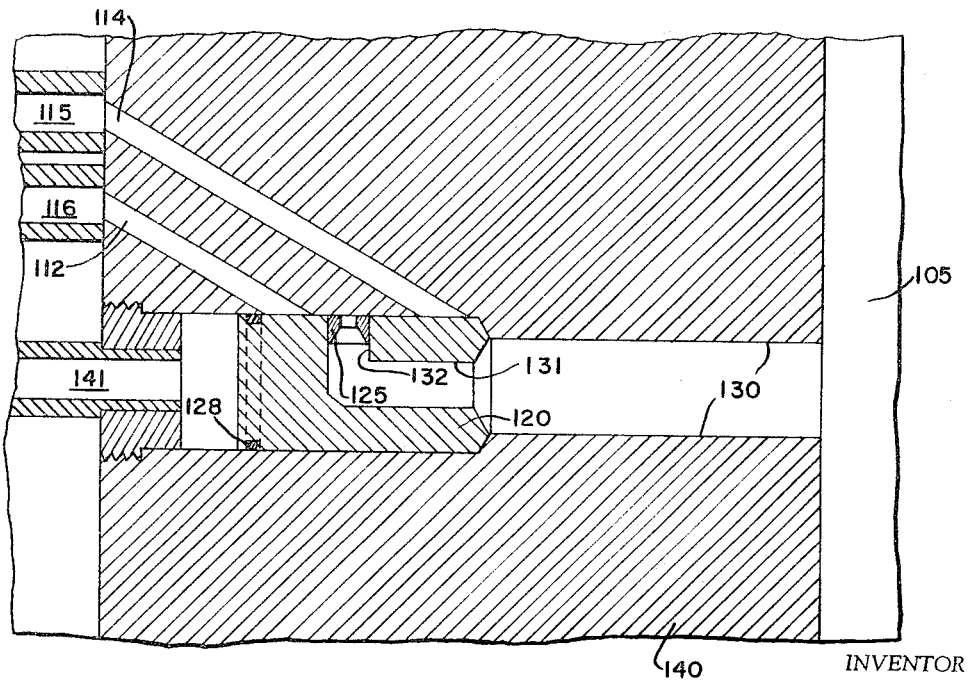
FIGURE 6 is an enlarged cross section view similar to FIGURE 5 but illustrating the discharge ports in closed position.

Referring to these figures and to FIGURES 5 and 6, the heated or chilled raw saline water is metered into the charging chamber 105, and then delivered in to the charging chamber or separating orifice (chamber) 130. Here closure means for the system, a piston 120, is depicted as in closed position (FIGURE 6).

Figures 7, 8:
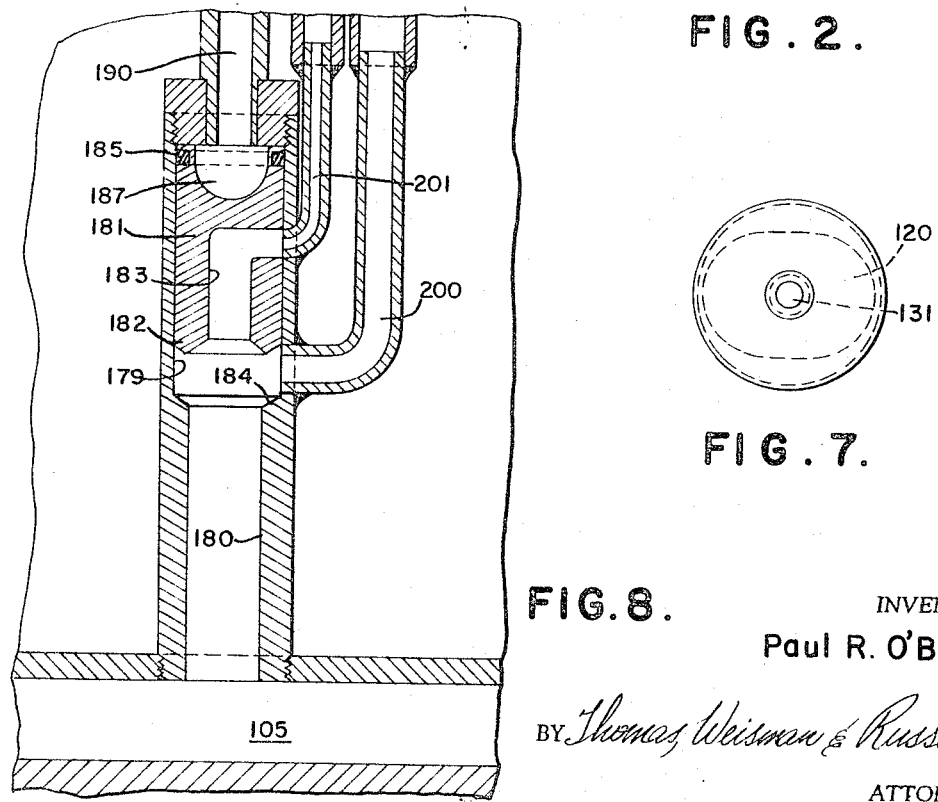
FIGURE 7 is a cross section taken on the line 7—7 of FIGURE 2.
FIGURE 8 is an alternate arrangement of the valve means similar to FIGURE 5.

The section taken on line 5—5 of FIGURE 4 through one of the chambers, and as shown in FIGURE 5, illustrates the piston 120 in open position at the time the raw saline water is charged into the chamber, and in the closed position of FIGURE 6, the piston seals off the discharge orifices or passageways 112 and 114. The piston 120 consists of its main body portion, formed in cross section as shown in FIGURE 7, a right angular turn to chamber 131 and as indicated at 132, an apertured insert 125 positioned in the latter, and a sealing O-ring 128.

Since the centrifugal separator is rotating continuously at a high speed the resultant centrifugal force provides the thrust necessary to force the saline water from charging chambers 105 into separating chambers 130 and 131. The shape of the combined chambers 130–131, as well as the size thereof, are important to bring about the desired separation of the salts from the water. This size will, of course, vary with the diameter of the rotor, generally indicated at 140 in FIGURE 4, and with its speed.

Within just a few seconds of operation the heavier salts move from chamber 130 past the chamber to the leading edge of the piston body 120 and thence into smaller chamber 131 in the piston.

Referring to FIGURE 6, it will be seen that the piston 120 is held in the closed position during this phase by the greater pressure of hydraulic fluid present in the conduit 141. When depressurized, the piston 120 is permitted to move to its outer limit by pressure within chamber 130 and in doing so, it consequently unblocks or opens discharge orifices 112 and 114 (FIGURE 5). The continued high pressure of the involved centrifugal force then causes the salt solids to be discharged through orifice or passageway 112 whereas the separated fresh water is discharged through conduit 114. Insert 125 is so sized as to permit only about 10 percent of the volume to pass through 112, causing the other 90 percent of the fresh water to pass through bore 114. This ratio may be decreased from 90/10 to 60/40 or less if conditions warrant, hence the double banks of separators, as shown, and as heretofore described.

After the water and salts have been separately discharged, the hydraulic system is again pressurized through port 141, thus forcing the piston 120 into a closed position, as in FIGURE 6. The unit is now ready for another charge of raw saline water. By allowing a relatively small amount of water to be discharged through chamber 131 and passageway 112 the salt concentrate is flushed from the surfaces of the inside diameter of the piston, thus rendering it ready for another fresh charge of raw saline water.

There are several important constructional details of the separation chamber that contribute to the functional character of its design. The chamber 130 is round, having an inside diameter that varies proportionately with the centrifugal speed of the rotor, as does the length of the chamber. For example: To develop a force of gravity 30,000 times that normally experienced by raw saline water in nature, the following formulae may be used to design the size of the rotor and its chambers taking into account the daily output of fresh water desired:

$F = .00034084 \ WRN^2/\text{lbs.}$, where $W$=weight in lbs.; $R$=radius in curved path in feet; and $N$=revolutions per minute of the centrifuge.

The chamber is the more efficient as its diameter size is reduced due to the fact that the salt ions have a shorter distance to travel. The chamber on the leading edge of the piston 120 serves to direct the salts into the smaller chamber 131 in the piston and at the same time permits the lighter water to recede toward the center of the rotor.

The piston is elongated or "out of round" in cross section, as shown in FIGURE 7, to prevent its rotation in order that the discharge orifice in the insert 125 consistently lines up with conduit 112. At any rate, other methods may be used to this end and this means of alignment is illustrative only.

Insert 125 (see FIGURE 6) is of the replaceable type and made from a hardened material such as stainless steel of the 302 classification, or equivalent. It is designed to have an orifice of suitable size that will permit the desired volume of salt concentrate to pass through it into discharge tube 112. Such volume will vary in proportion to the fresh water discharged through passageway 114 in the order of ratios of from 1:10 to 1:1.

The piston 120 can be made from a light weight metallic material such as titanium or stainless steel, although this does not eliminate the possibility of the use of other materials.

The rotor 140 can be fabricated of a light weight metallic material, such as titanium or magnesium, and can be so designed that all but a minimum wall thickness is maintained around the piston and chamber in order to reduce the mass which multiplies in weight when subjected to centrifugal force. Other materials may be used in the construction of the rotor that are not subject to severe corrosion by sea water.

O-ring 123 is used for the purpose of providing a seal between the piston and the inside mating surface of the rotor. It can be of neoprene rubber, brass or other material and the fit, between rotor and piston, is held to reasonably close limits—on the order of 0.0003 per inch. Fresh water is the hydraulic medium employed to exert pressure, and by known external means, through passageway 141, and upon the piston 120.

The invention is also not limited to chambers that are round in shape. Ovals, squares, hexagons, octagons, and other geometric projections may be employed with equal functional efficiency. In like manner the shape of the piston is not limited to the oval shape shown in FIGURE 7, but may assume other geometric patterns with equal efficiency.

The mass of material shown in cross section in FIGURES 5 and 6 may be of only 0.30 inch in thickness surrounding the chamber 130, piston 120, discharges 112 and 114, as well as hydraulic line 141. The thickness of material surrounding charging chamber 105 may be only 0.6 to less than .060 if high strength steel is employed. In this type of construction the chamber tubes can be welded in the proper configuration one to the other.

FIGURE 4 also illustrates other details of the centrifugal separator. It is to be noted that the discharge tube 114 empties into a collector ring 115, whereas discharge tube 112 empties into a like collector ring 116. Collector ring 115 is used to collect the fresh water from all stages in the separator assembly which by means of pump 150 is discharged to the fresh water storage.

The salt concentrate is collected from each stage by collector ring 116 and then by means of pump 151 is directed to the next bank of separators or to salt concentrate storage.

Conduit or passageway 155 is used to direct hydraulic fluid to each piston via conduits 157. The pump 151 provides the hydraulic pressure necessary for movement of the piston 120. Collector ring piping network 158 directs the hydraulic fluid to the top of each piston via the feed lines 155.

Chamber 130 and piston 120 are arranged in rows of four (see FIGURES 2 and 3) which are spaced uniformly with only enough distance between each row to permit the discharge orifices or passageways 112 and 114 to be aligned with the drain collector rings 115 and 116 at each row. Each row should consist of an equal number of chambers 180 degrees apart. For purposes of this drawing only four chambers are shown, as in FIGURE 3; however, this number may be greater or smaller depending upon the size of the rotor, diameter of the chambers and other constructional features. The equal number is to prevent an unbalanced condition although this imbalance tends to diminish as the speed and frequency of the chambers increases.

The feed line 160 connects with the metering valves 50 and as shown in FIGURE 1. The connection 161 directs raw saline water into the referred to charging chamber 105.

Figure 2:
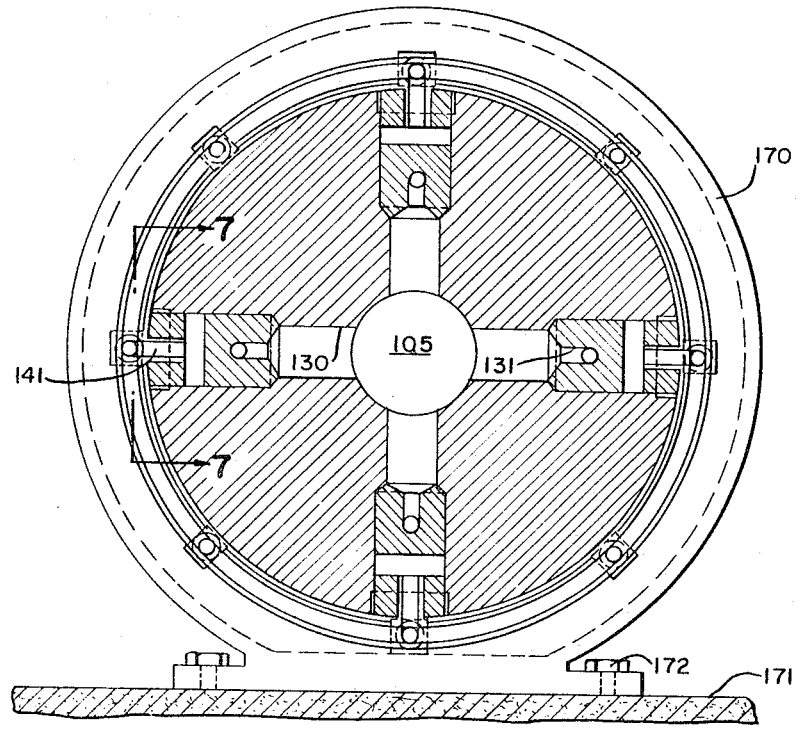
FIGURE 2 is an enlarged sectional view taken on the line 2—2 of FIGURE 5.

In FIGURE 2 greater detail is shown of the charging chamber 105, hydraulic system 141, and the element 170 within which the collector ring passageways 112 and 114 are formed. The centrifuge assemblies are securely mounted to a base 171 as by the usual bolts 172.

An alternate arrangement of the slideable valve means, comparatively equivalent to the arrangement heretofore described with respect to the arrangement of the piston element 120, is shown in FIGURE 8. Here again, the arrangement is radially disposed and the separating chamber 180 opens into the axial charging chamber 105. A suitable sliding valve or piston element 181 is adapted to reciprocate within a bore 179, and as well, to seal the passageway 180. In the latter regard, the piston is chamfered as at 182 to seat within a corresponding valve seat formation 184. The piston is provided with an interior passageway 183 which is of substantially smaller diameter than the charging chamber 180.

A discharge passageway or bore 200 of relatively large diameter opens into the charging chamber 180; on the other hand, a bore or conduit 201 of substantially smaller diameter is adapted to interconnect with passageway 183 in the valve 181 when the latter is disposed in its "open" position, as shown in FIGURE 8. Obviously, when the piston element is moving radially inwardly the required distance to seat it then the chamber 180 and both passageways 200 and 201 are sealed against fluid flow.

Reciprocation of the valve element or piston within the more provided for that purpose is accomplished in the same way as described with respect to the alternate shown in FIGURES 5 and 6, i.e., by the admission or release of pressure from an external pressure source, through line 190. Fluid pressure from the latter impinges upon a semi spherical element 187 seated within a depression of like configuration within the piston 181, the latter having the usual O-ring 185 for sealing purposes. Upon removal of pressure from the conduit 190, pressure build up within the charging chamber will open this valve arrangement to the position shown in FIGURE 8, when both passageways 200 and 201 will permit the exit of respectively, the purified aqueous solution through 200, and the concentrated salt slurry through 201. These separating components are collected in the same type of collector ring arrangement as heretofore described with respect to FIGURE 4.

While preferred forms of the invention and its method of utilization have been disclosed in the foregoing, other equivalent forms thereof may be used, all contemplated by the scope of the claims appended hereto.

I claim:
1. In a liquid purification system, a centrifugal separator adapted to exert a centrifugal force in excees of about 20,000 times the force of gravity upon a solution containing dissolved solids whereby to separate said solids from said solution, said separator comprising a rotatable body element possessed with means for high speed rotation thereof, an axially disposed charging chamber in said element for receiving said solution, equally spaced and radially disposed separating chambers interconnected with said charging chamber, said separating chambers having a radially slideable closure means therefor, said chambers including an inner radially disposed liquid receiving passageway and a radial solid slurry receiving passageway extending therefrom, a discharge slurry conduit and a liquid discharge conduit, said closure means for said liquid receiving passageway having a slurry receiving bore therein of lesser diameter than said liquid receiving passageway and adapted to be aligned with said discharge slurry conduit, means to radially move said closure means to selectively seal and open said liquid and slurry discharge conduits, and collector means circumferentially disposed about said body element to separately receive said slurry and said liquid from the respective discharge conduits thereof.

2. The invention as defined in claim 1 wherein said means to radially move said closure means comprises an hydraulic system for periodic exertion of fluid pressure upon the end of said closure means opposite said charging chamber.

3. The invention as defined in claim 1 wherein the relative size of said rotatable body element to achieve a centrifugal force of 20,000 times the force of gravity is computed from the formula $F = .00034084\ WRN^2/lbs.$, where W=weight in pounds; R=radius of curved path in feet; and N=Revolutions per Minute.

4. The system as defined in claim 1 wherein pluralities of said separators are interconnected in series, tandem fashion, so that the purified solution output, and the slurry output, of a preceding plurality are each charged to a succeeding plurality.

References Cited by the Examiner

UNITED STATES PATENTS

| | | | |
|---|---|---|---|
| 1,999,712 | 4/1935 | Zorn et al. | |
| 2,321,887 | 6/1943 | Ayres | 233—20 |
| 2,467,742 | 4/1949 | Hanno | 233—20 |
| 2,947,472 | 8/1960 | Skarstrom et al. | 233—18 X |
| 3,049,889 | 8/1962 | Carfagno | 62—123 X |
| 3,255,805 | 6/1966 | Bechard | 233—11 X |

FOREIGN PATENTS 907,657  10/1962  Great Britain.

M. CARY NELSON, *Primary Examiner.*

HENRY T. KLINKSIEK, *Examiner.*